Aug. 18, 1931.  N. LITTELL  1,819,471
AUTOMOBILE BUMPER
Filed Feb. 7, 1927
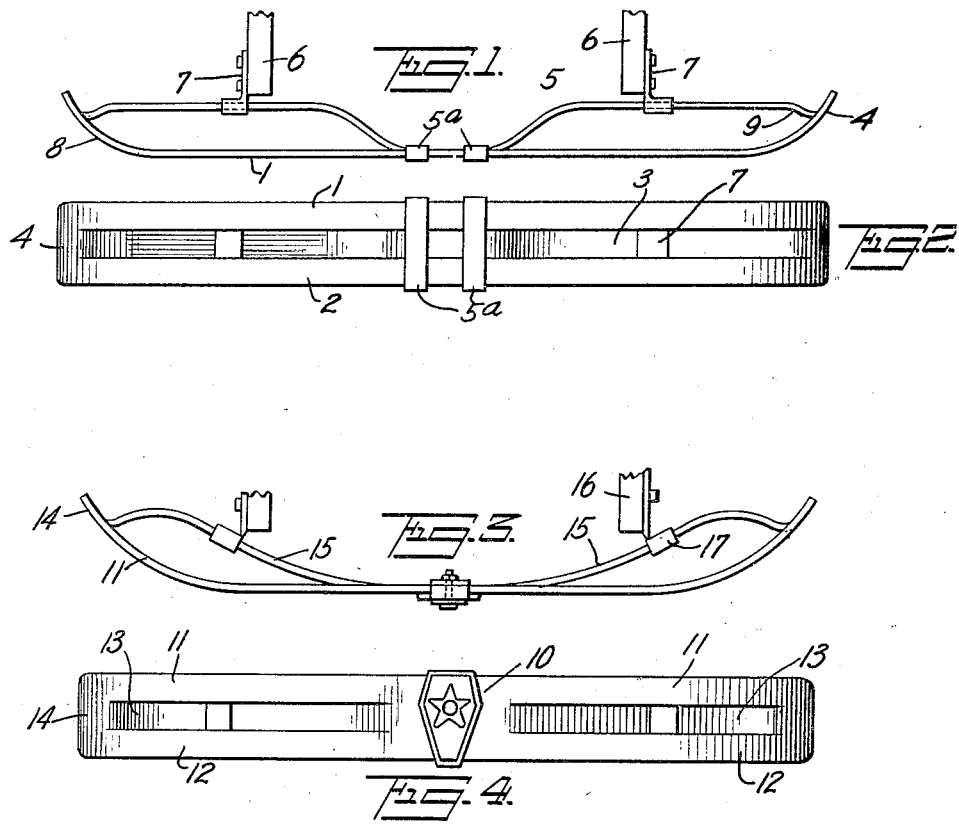
INVENTOR
NELSON LITTELL
BY
William P. Hammond
ATTORNEY Patented Aug. 18, 1931

1,819,471

UNITED STATES PATENT OFFICE

NELSON LITTELL, OF MOUNT VERNON, NEW YORK

AUTOMOBILE BUMPER

Application filed February 7, 1927. Serial No. 166,297.

This invention relates to an improvement in bumpers or bumperettes for automobiles, trucks, and other vehicles, and to a method of making the same, and is a continuation in part of applicant's copending application No. 81,742, filed January 16, 1926, Patent No. 1,616,695.

It is an object of the invention to provide a bumper of distinctive appearance, combining grace, beauty, strength and resiliency, at a lower cost than has been heretofore, possible.

Another object of the invention is to provide a multiple bar bumper having two or more separated impact bars and one or more intermediate back bars, all of which parts are integrally connected, having been formed from one piece of metal.

Another object of the invention is to provide an automobile bumper of the multiple impact bar type, with integral connections between the impact bars and back bar in one piece with a minimum of manufacturing operations.

Another object of the invention is to provide a method of manufacturing one piece automobile bumpers of the type described in which the bumper is formed from a single wide strip of bumper material by slitting and bending and without any assembling operations.

Various other objects and advantages of the invention will appear as the description thereof proceeds.

Referring now to the drawings, which illustrate certain preferred forms of embodiment of the invention, Fig. 1 is a plan view, and Fig. 2 is a front elevation of one form of automobile front bumper produced in accordance with my invention;

Figs. 3 and 4 are, respectively, a plan view and front view of another form of automobile front bumper embodying the principles of my invention.

In the embodiment of the invention illustrated in Figs. 1 and 2, the automobile bumper comprises a pair of vertically spaced front bumper strips or bars 1 and 2, having an intermediate space 3 and integral ends 4. It will be understood that the ends 4 may be wider or narrower than the width of the bumper strips 1 and 2, and that the bumper bars 1 and 2 may have other configurations and shapes imparted thereto than the plain bar shown. A back bar 5, formed by cutting longitudinal slits through the bumper metal, is bent rearwardly relative to a center line drawn through the connections at the end, and the face of the bumper is bent forwardly therefrom. Intermediate the ends of the bumper, the back bar 5 is again bent, and to a position that the center portion longitudinally is in a vertical plane through the bumper face. To secure the forwardly bent longitudinal center of the back bar 5 to the center of the face of the front or impact members 1 and 2, any clamping means such as shown at 5a may be used, adapted to prevent rattling, and to increase the resistance of the bumper to shock. As will be seen the displaced metal of the front impact bars provides the material for the back bar 5 and as the material is not slit all the way across, the back bar and impact bars are integrally connected. This bumper is adapted to be attached to the side frames or the like 6 of the automobile by means of suitable attaching brackets 7, which adjustably grip the back bar 5.

It will be realized that an automobile bumper of this construction, formed from one piece of metal, has many advantages over the bumpers of the prior art, which comprise a plurality of separate impact bars and back bars connected by means of bolts, clamps, or the like. The bumper presents a neat appearance of massiveness and rigidity, it has no separable parts to be assembled or work loose and rattle in service, and is of greater strength and resiliency than the same bumper made of a plurality of parts, and is easy to handle and to attach to the automobile.

In the manufacture of a bumper of this type, a strip of metal of the desired width of the impact portion is inserted in a suitable press or shear and sheared or slit along the inner edge of the bars 1 and 2 to within a suitable distance of the ends 4. The material for the back bar 5 is then displaced from the mid portion of the slab of metal, to produce the opening 3 between the separated impact bars 1 and 2, and the ends 4 are bent rearwardly to preserve the contour of the bumper. This punching and pressing operation is preferably carried out when the metal is hot, although it is possible to carry out the operation on cold metal. Following the forming operation, the bumper may be suitably annealed to relieve the strain of the stamping and forming operation and impart the desired resiliency thereto, after which the front bar members and back bar may be suitably finished by grinding, polishing, electroplating, painting, japanning, or the like. It will be understood that various configurations can be given to the front of the bumper and that it can be made wider or narrower than shown, or that more than two front impact bars may be used, if desired. If desired, the slits along each side of the opening 3 may be formed by sawing, cutting, or the like before the pressing or shaping operation.

The curvature of the front bars and of the back bar may be controlled by the extent of bending at the points 8 and 9 adjacent the connection of the back bar to the impact bar members. In the embodiment shown the curvature of the portions 8 and 9 adjacent this connection is approximately the same; in other words, the back bar extends rearwardly and the front bars extend forwardly approximately equal distances from this point of connection. A more rounded impact surface may be produced by varying the angle and curvature of the back bar and impact bars adjacent the point of connection.

Figs. 3 and 4 show another embodiment of the invention comprising a front impact portion 10, with an unbroken center having side impact bars 11 and 12 with intervening openings 13 at each side of the unbroken central portion and integral ends 14 of approximately the same width as the unbroken central portion of the impact surface 10. The material displaced from the opening 13 is used to form the back bar members 15 which are connected to the automobile frame 16 by means of clamp members 17 or the like. This bumper may be formed in approximately the same manner as the bumper shown in Figs. 1 and 2, except that two slits or shears are made at each side of the center instead of through the center. If desired the slits may be carried to the ends 14 of the bumper and after shaping the portions 11, 12, and 13 extending from the integral center, may be secured together at the ends by suitable clamps or bolts.

It will be understood that my invention contemplates broadly the production of a one-piece automobile bumper having spaced impact portions and integral back bars or attaching portions and that the principles of the invention may be applied to produce bumpers of various design within the spirit of the invention and the scope of the appended claims.

I claim

1. A one piece automobile bumper comprising vertically spaced impact portions, a rearwardly bent backing member integrally attached to the ends of the impact portions, and clamped substantially intermediate of the impact portions.

2. A one piece automobile bumper comprising vertically spaced impact portions with integrally connected ends, and a back bar integral therewith, spaced rearwardly from said impact portions and being substantially the same length as the impact portion and adapted to be secured to the automobile frame, and clamped substantially intermediately to the impact portions.

3. An automobile bumper comprising two vertically disposed impact portions integrally attached at the ends to each other and to a rearwardly projected back bar, and means to connect the center of the impact portions and the back bar together the entire construction being formed in a unit.

4. An automobile bumper bar formed from a single piece of material and comprising a front impact bar, and suporting bars having one end only of each integrally connected to said impact bar between the ends thereof.

5. An automobile bumper bar formed from a single piece of material and comprising parallel impact bars, and an intermediate supporting bar having one end integral with said impact bars and the other end otherwise connected thereto.

6. An automobile bumper bar formed from a single piece of material and comprising parallel impact bars, an intermediate supporting bar having one end integral with said impact bars and a clamp connecting the other end of said supporting bar to said impact bars.

7. An automobile bumper bar formed from a single piece of material and comprising parallel impact bars, and intermediate supporting bars formed integral with said impact bars and having a part of the length thereof arranged substantially parallel to said impact bars and spaced rearwardly therefrom.

8. An automobile bumper bar formed from a single piece of material and comprising parallel impact bars, intermediate supporting bars having one end of each integral with said impact bars, and clamps connecting the other ends of said supporting bars to said impact bars.

9. An automobile bumper bar formed from a single piece of material comprising parallel impact bars, intermediate supporting bars integrally connected at one end to said impact bars and having a part of the length of each supporting bar spaced rearwardly from and arranged substantially parallel to said impact bars, and clamps connecting the other ends of said supporting bars to said impact bars.

In testimony whereof I have affixed my signature to this specification.

NELSON LITTELL.